(12) United States Patent
Yamazaki (10) Patent No.: US 12,151,968 B2
(45) Date of Patent: Nov. 26, 2024

(54) TOP PLATE FOR COOKING DEVICE AND TOP PLATE FOR DISPLAY-ATTACHED COOKING DEVICE (71) Applicant: NIPPON ELECTRIC GLASS CO., LTD., Otsu (JP)

(72) Inventor: Yusuke Yamazaki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 666 days.

(21) Appl. No.: 17/430,416

(22) PCT Filed: Apr. 16, 2020

(86) PCT No.: PCT/JP2020/016658
§ 371 (c)(1),
(2) Date: Aug. 12, 2021

(87) PCT Pub. No.: WO2020/218135
PCT Pub. Date: Oct. 29, 2020

(65) Prior Publication Data
US 2022/0153637 A1 May 19, 2022

(30) Foreign Application Priority Data
Apr. 23, 2019 (JP) ................. 2019-081903

(51) Int. Cl.
*H05B 6/12* (2006.01)
*C03C 17/38* (2006.01)
(Continued)

(52) U.S. Cl.
CPC ............ *C03C 17/38* (2013.01); *G02B 1/11* (2013.01); *H05B 6/1218* (2013.01);
(Continued)

(58) Field of Classification Search
CPC ........ A61K 38/00; C07K 14/79; C07K 16/18; Y10S 530/809; Y10S 530/832;
(Continued)

(56) References Cited

U.S. PATENT DOCUMENTS 7,208,703 B2 *  4/2007  Shimatani ........... C03C 17/3435
                                                    219/443.1
9,863,643 B2 *  1/2018  Aihara .................... F24C 7/083

FOREIGN PATENT DOCUMENTS

JP      2008-267633 A    11/2008
JP      2011-208820 A    10/2011
(Continued)

OTHER PUBLICATIONS

Official Communication issued in International Patent Application No. PCT/JP2020/016658, mailed on Jul. 7, 2020.

*Primary Examiner* — Quang T Van
(74) *Attorney, Agent, or Firm* — Keating & Bennett, LLP (57) ABSTRACT

A top plate for a cooking device including a displaying region capable of showing information given from a display and a non-displaying region blocking visible light includes a glass substrate having a cooking surface on which a utensil is to be put and an underside surface opposite to the cooking surface; a dielectric multi-layer provided on the underside surface of the glass substrate; a light transmissive layer provided on a portion of the dielectric multi-layer overlapped with the displaying region and containing a transparent material; and a light blocking layer provided on a portion of the dielectric multi-layer overlapped with the non-displaying region, wherein the top plate has a reflectance in a range of 40% to 80%, and an absolute value of a difference in refractive index between the light transmissive layer and the light blocking layer is 0.1 or less.

10 Claims, 8 Drawing Sheets (51) Int. Cl.
*G02B 1/11* (2015.01)
*H05B 3/68* (2006.01)

(52) U.S. Cl.
CPC .. *C03C 2217/213* (2013.01); *C03C 2217/218* (2013.01); *C03C 2217/734* (2013.01)

(58) Field of Classification Search
CPC ............. C03C 17/38; C03C 2217/213; C03C 2217/218; C03C 2217/734; C03C 17/42; G02B 1/11; G02B 5/285; H05B 6/1218; F24C 15/10
USPC ....... 219/622, 620, 621, 633, 635, 644, 647, 219/650, 443.1
See application file for complete search history.

(56) References Cited

FOREIGN PATENT DOCUMENTS

| | | | |
|---|---|---|---|
| JP | 2014-215018 A | 11/2014 |
| JP | 2014-234980 A | 12/2014 |
| WO | 2017/043640 A1 | 3/2017 |

* cited by examiner

TOP PLATE FOR COOKING DEVICE AND TOP PLATE FOR DISPLAY-ATTACHED COOKING DEVICE

TECHNICAL FIELD

The present invention relates to top plates for cooking devices and display-attached top plates for cooking devices.

BACKGROUND ART

Recently, top plates for cooking devices, including an electromagnetic cooking device, a radiant heater cooking device, and a gas cooking device, have been provided with luminescent signs using an LED (light emitting diode) or the like for the purpose of displaying various types of information relating to their power, heating state, and so on. Furthermore, in the top plates for cooking devices, for the purpose of hiding the internal structure of the cooking device, a black glass is used or a transparent glass is provided with a heat-resistant resin layer.

Patent Literature 1 below discloses a cooking device top plate including: a glass plate; an inorganic pigment layer provided on the glass plate; and a display layer provided on the inorganic pigment layer. The display layer includes: a transparent resin portion capable of transmitting LED light or the like; and a heat-resistant resin portion capable of blocking the LED light or the like. In Patent Literature 1, characters, numerals, signs, and so on are displayed by changing the shape of a transmission portion where the LED light or the like transmits or by transmitting patterned light through the transmission portion.

CITATION LIST

Patent Literature

[PTL 1]
    JP-A-2014-215018

SUMMARY OF INVENTION

Technical Problem

In recent years, there have been developed top plates for use in cooking devices with a built-in display. However, there arises a problem that, because no light-blocking layer is provided in a displaying region of the top plate where information given from the display is shown, the internal structure, such as the display, of the cooking device cannot be hidden. Furthermore, if the indication in the displaying region is made clearly visible during turn-on of the display and, at the same time, the hiding of the internal structure of the cooking device during turn-off of the display is pursued, the boundary between the displaying region and the non-displaying region may be seen during turn-off of the display, which may present a problem of unfavorable aesthetic appearance.

An object of the present invention is to provide a top plate for a cooking device and a display-attached top plate for a cooking device which are capable of making the indication in a displaying region clearly visible during turn-on of the display and, during turn-off of the display, capable of making the boundary between the displaying region and a non-displaying region less visible while hiding the internal structure of the cooking device.

Solution to Problem

A top plate for a cooking device according to the present invention is a top plate for a cooking device that includes a displaying region capable of showing information given from a display and a non-displaying region blocking visible light, the top plate including: a glass substrate having a cooking surface on which a utensil is to be put and an underside surface opposite to the cooking surface; a dielectric multi-layer provided on the underside surface of the glass substrate; a light transmissive layer provided on a portion of the dielectric multi-layer overlapped with the displaying region and containing a transparent material; and a light blocking layer provided on a portion of the dielectric multi-layer overlapped with the non-displaying region, wherein the displaying region has a reflectance in a range of 20% to 80% and an absolute value of a difference in refractive index between the light transmissive layer and the light blocking layer is 0.1 or less.

In the present invention, the transparent material is preferably an ultraviolet curable resin.

In the present invention, the light transmissive layer preferably further serves as an adhesive layer.

In the present invention, the light blocking layer preferably contains a resin and a coloring pigment.

In the present invention, the light transmissive layer and the light blocking layer preferably have substantially the same thickness.

In the present invention, the dielectric multi-layer is preferably a layered film formed so that high-refractive index films having a relatively high refractive index and low-refractive index films having a relatively low refractive index are alternately layered.

A top plate for a cooking device according to the present invention is a top plate for a cooking device that includes a displaying region capable of showing information given from a display and a non-displaying region blocking visible light, the top plate including: a glass substrate having a cooking surface on which a utensil is to be put and an underside surface opposite to the cooking surface; a dielectric multi-layer provided on the underside surface of the glass substrate; a light transmissive layer provided on a portion of the dielectric multi-layer overlapped with the displaying region and containing a transparent material; and a light blocking layer provided on a portion of the dielectric multi-layer overlapped with the non-displaying region, wherein the displaying region has a reflectance in a range of 20% to 80%, an absolute value of a difference in lightness between the displaying region and the non-displaying region is 5 or less, and an absolute value of a difference in chroma between the displaying region and the non-displaying region is 1 or less.

A display-attached top plate for a cooking device according to the present invention includes: the top plate for a cooking device structured according to the present invention; and a display provided directly or indirectly on the light transmissive layer forming part of the top plate for a cooking device.

In the present invention, a cover glass for the display is preferably bonded directly to the light transmissive layer.

Advantageous Effects of Invention

The present invention enables provision of a top plate for a cooking device and a display-attached top plate for a cooking device which are capable of making the indication in a displaying region clearly visible during turn-on of the display and, during turn-off of the display, capable of making the boundary between the displaying region and a non-displaying region less visible while hiding the internal structure of the cooking device.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference characters.

[Top Plate for Cooking Device]

First Embodiment

Figure 1:
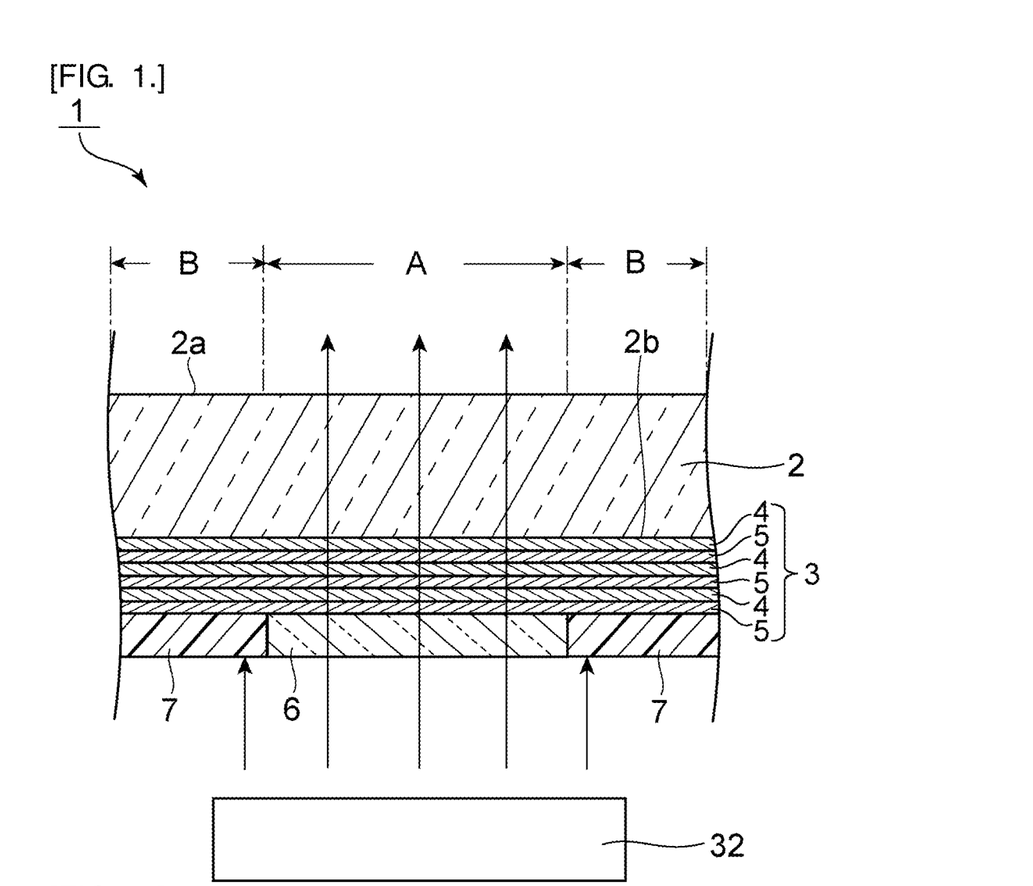
FIG. 1 is a schematic cross-sectional view showing a top plate for a cooking device according to a first embodiment of the present invention.

FIG. 1 is a schematic cross-sectional view showing atop plate for a cooking device according to a first embodiment of the present invention. As shown in FIG. 1, a top plate 1 for a cooking device (hereinafter, the "top plate 1 for a cooking device" is referred to simply as the "top plate 1") includes a glass substrate 2. The glass substrate 2 has a cooking surface 2a and an underside surface 2b opposed to each other. The cooking surface 2a is a surface located on the side of the substrate where a cooking utensil, such as a pot or a frying pan, is to be put. The underside surface 2b is a surface located on the side of the substrate close to the interior of the cooking device and facing a display 32 and a heater. Therefore, the cooking surface 2a and the underside surface 2b are top and under sides of the same substrate.

The glass substrate 2 transmits light in at least a part of a wavelength range of 400 nm to 700 nm. The glass substrate 2 maybe clear and colored, but is preferably clear and colorless from the perspective of further improving the aesthetic appearance of the top plate 1. Note that "clear" herein means that the average light transmittance in a visible wavelength range of 400 nm to 700 nm is 70% or more.

The top plate 1 undergoes heating and cooling repeatedly. Therefore, the glass substrate 2 preferably has high thermal resistance and a low coefficient of thermal expansion. Specifically, the softening temperature of the glass substrate 2 is preferably 700° C. or higher and more preferably 750° C. or higher. Furthermore, the average coefficient of linear thermal expansion of the glass substrate 2 at 30° C. to 750° C. is preferably in a range of $-10\times10^{-7}/°$ C. to $+60\times10^{-7}/°$ C., more preferably in a range of $-10\times10^{-7}/°$ C. to $+50\times10^{-7}/°$ C., and still more preferably in a range of $-10\times10^{-7}/°$ C. to $+40\times10^{-7}/°$ C. Therefore, the glass substrate 2 is preferably made of a glass having a high glass transition temperature and low expansibility or made of a low-expansion crystallized glass. A specific example of the low-expansion crystallized glass is "N-0" manufactured by Nippon Electric Glass Co., Ltd. Borosilicate glass or the like may be used as the glass substrate 2.

No particular limitation is placed on the thickness of the glass substrate 2. The thickness of the glass substrate 2 can be appropriately selected according to the light transmittance and so on. The thickness of the glass substrate 2 may be, for example, about 2 mm to about 8 mm.

A dielectric multi-layer 3 is provided on the underside surface 2b of the glass substrate 2. A light transmissive layer 6 and a light blocking layer 7 are provided on the dielectric multi-layer 3. In this embodiment, a region where the light transmissive layer 6 is provided in plan view is a displaying region A. On the other hand, a region where the light blocking layer 7 is provided in plan view is a non-displaying region B.

A display 32, such as a liquid crystal display, is provided below the light transmissive layer 6 and the light blocking layer 7. The display 32 is a member provided for the purpose of displaying information in the displaying region A. No particular limitation is placed on the type of information to be displayed in the displaying region A and examples include information indicating a state of the cooking device, such as a state that the power is on or a state that the cooking device is during heating, and information on time and so on.

In the displaying region A, light from the display 32 is emitted through the light transmissive layer 6, the dielectric multi-layer 3, and the glass substrate 2 to the outside. On the other hand, in the non-displaying region B, the light from the display 32 is blocked by the light blocking layer 7. Therefore, by transmitting the light from the display 32 through the displaying region A, characters, numerals, signs, and so on can be displayed in the displaying region A.

The reflectance of the top plate 1 in the displaying region A is 20% to 80%. The reflectance used herein refers to an average value of reflectances on the cooking surface 2a of the top plate 1 at wavelengths of 400 nm to 700 nm. From the perspective of making the indication in the displaying region A more clearly visible during turn-on of the display 32 and, at the same time, more certainly hiding the internal structure of the cooking device during turn-off of the display 32, the reflectance of the top plate 1 in the displaying region A is preferably not less than 30%, more preferably not less than 40%, preferably not more than 60%, and more preferably not more than 50%.

The dielectric multi-layer 3 is a semi-transmissive film that can make the indication in the displaying region A clearly visible during turn-on of the display 32 and can hide the internal structure of the cooking device during turn-off of the display 32.

The dielectric multi-layer 3 is a layered film formed so that low-refractive index films 4 having a relatively low refractive index and high-refractive index films 5 having a relatively high refractive index are layered alternately in this order on the underside surface 2b of the glass substrate 2. In this embodiment, the number of layers forming the dielectric multi-layer 3 is six. Furthermore, in this embodiment, the low-refractive index films 4 are made of $SiO_2$ and the high-refractive index films 5 are made of $Nb_2O_5$.

However, in the dielectric multi-layer 3, the low-refractive index films 4 and the high-refractive index films 5 need not necessarily be alternately layered so long as the reflectance of the top plate 1 is in the above range. Some of the low refractive index films 4 and some of the high-refractive index films 5 maybe alternately layered. Furthermore, although in this embodiment the low-refractive index films 4 and the high-refractive index films 5 are alternately layered, with the low-refractive index film 4 first, on the underside surface 2b of the glass substrate 2, the high-refractive index films 5 and the low-refractive index films 4 maybe alternately layered with the high-refractive index film 5 first.

Examples of the material for the low-refractive index film 4 include silicon oxide, as used in this embodiment, and aluminum oxide.

Examples of the material for the high-refractive index film 5 include niobium oxide, as used in this embodiment, titanium oxide, zirconium oxide, hafnium oxide, tantalum oxide, silicon nitride, aluminum oxide, and aluminum nitride.

The thickness of the low-refractive index film 4 is not particularly limited, but, for example, may be not less than 1 nm and not more than 400 nm. On the other hand, the thickness of the high-refractive index film 5 is not particularly limited, but, for example, may be not less than 1 nm and not more than 300 nm.

The total number of the low-refractive index films 4 and the high-refractive index films 5 in the dielectric multi-layer 3 is not particularly limited, but, for example, may be not less than 4 and not more than 16.

The light transmissive layer 6 is provided on the dielectric multi-layer 3. More specifically, the light transmissive layer 6 is provided on a portion of the dielectric multi-layer 3 overlapped with the displaying region A in plan view. The light transmissive layer 6 may be clear and colored, but is preferably clear and colorless from the perspective of making the indication in the displaying region A more clearly visible during turn-on of the display 32. The light transmittance of the light transmissive layer 6 in a visible wavelength range of 400 nm to 700 nm is preferably 70% or more.

The light transmissive layer 6 contains a transparent material. The transparent material refers to a material having a light transmittance of 70% or more in a visible wavelength range of 400 nm to 700 nm. In this embodiment, the transparent material is an ultraviolet curable resin. Examples of the ultraviolet curable resin include acrylic resins, epoxy resins, silicone resins, and urethane resins. These resins may be used singly or in a combination of a plurality of them. The transparent material may be any other transparent resin. The light transmissive layer 6 can be formed, for example, by applying a solution of an ultraviolet curable resin or applying a sol-gel solution.

The light transmissive layer 6 may further serve as an adhesive layer. Therefore, the light transmissive layer 6 may be an optically clear adhesive sheet (OCA). When the light transmissive layer 6 further serves as an adhesive layer, the display 32 can be bonded directly to the top plate, which enables a reduction in number of components.

Furthermore, the light transmissive layer 6 is preferably substantially free of coloring pigment. Note that "substantially free of coloring pigment" herein means that the content of coloring pigment contained in the light transmissive layer 6 is 5% by mass or less.

However, the light transmissive layer 6 may further contain an extender pigment, such as talc or mica.

The thickness of the light transmissive layer 6 is not particularly limited, but is preferably not less than 10 μm, more preferably not less than 50 μm, preferably not more than 500 μm, and more preferably not more than 100 μm. When the thickness of the light transmissive layer 6 is in the above range, the indication in the displaying region A during turn-on of the display 32 can be made more clearly visible.

The light blocking layer 7 is provided on the dielectric multi-layer 3. More specifically, the light blocking layer 7 is provided on a portion of the dielectric multi-layer 3 overlapped with the non-displaying region B in plan view. In this embodiment, the light blocking layer 7 is black. The color of the light blocking layer 7 is not particularly limited so long as it can block light (visible light) from the display 32.

The light blocking layer 7 may be made of, for example, resin or glass. However, as will be described later, from the perspective of making the boundary between the displaying region A and the non-displaying region B more difficult to see during turn-off of the display 32, the light blocking layer 7 is preferably made of resin.

As the resin forming the light blocking layer 7, for example, appropriate resins described in relation to the light transmissive layer 6 can be used. Alternatively, from the perspective of further increasing the thermal resistance of the top plate 1, the resin forming the light blocking layer 7 may be a heat-resistant resin. No particular limitation is placed on the type of the heat-resistant resin and examples that can be used include silicone resins and polyimide resins. Preferred among them are silicone resins in which a functional group bound directly to a silicon atom is at least one of a methyl group and a phenyl group. In this case, the thermal resistance of the top plate 1 can be further increased.

These resins may be used singly or in a combination of a plurality of them.

Furthermore, since the light blocking layer 7 is a coating film provided in order to more certainly increase the hideability of the internal structure of the cooking device, it preferably contains a colored coloring pigment. The type of the colored coloring pigment can be appropriately selected in consideration of the hideability of the internal structure of the cooking device.

The type of the coloring pigment is not particularly limited so long as it is a colored inorganic substance. Examples of the coloring pigment include: white pigment powders, such as $TiO_2$ powder, $ZrO_2$ powder, and $ZrSiO_4$ powder; blue inorganic pigment powders containing Co; green inorganic pigment powders containing Co; Ti—Sb—Cr-based or Ti—Ni-based yellow inorganic pigment powders, Co—Si-based red inorganic pigment powders; brown inorganic pigment powders containing Fe; and black inorganic pigment powders containing Cu.

Specific examples of the blue inorganic pigment powders containing Co include Co—Al-based and Co—Al—Ti-based inorganic pigment powders. A specific example of the Co—Al-based inorganic pigment powders is $CoAl_2O_4$ powder. A specific example of the Co—Al—Ti-based inorganic pigment powders is Co—$Al_2O_4$—$TiO_2$—$Li_2O$ powder.

Specific examples of the green inorganic pigment powders containing Co include Co—Al—Cr-based and Co—Ni—Ti—Zn-based inorganic pigment powders. A specific example of the Co—Al—Cr-based inorganic pigment powders is Co(Al, Cr)$_2$O$_4$ powder. A specific example of the Co—Ni—Ti—Zn-based inorganic pigment powders is (Co, Ni, Zn)$_2$TiO$_4$ powder.

Specific examples of the brown inorganic pigment powders containing Fe include Fe—Zn-based inorganic pigment powders. A specific example of the Fe—Zn-based inorganic pigment powders is (Zn, Fe)Fe$_2$O$_4$ powder.

Specific examples of the black inorganic pigment powders containing Cu include Cu—Cr-based inorganic pigment powders and Cu—Fe-based inorganic pigment powders. Specific examples of the Cu—Cr-based inorganic pigment powders include Cu(Cr, Mn)$_2$O$_4$ powder and Cu—Cr—Mn powder. A specific example of the Cu—Fe-based inorganic pigment powders is Cu—Fe—Mn powder.

The content of the coloring pigment contained in the light blocking layer 7 is preferably not less than 50% by mass, more preferably not less than 65% by mass, preferably not more than 90% by mass, and more preferably not more than 75% by mass. When the content of the coloring pigment for use in the light blocking layer 7 is equal to or higher than the above-described lower limit, the hideability of the internal structure of the cooking device can be further increased. Furthermore, when the content of the coloring pigment for use in the light blocking layer 7 is equal to or lower than the above-described upper limit, the adhesiveness of the light blocking layer 7 to the dielectric multi-layer 3 can be further increased.

The light blocking layer 7 may further contain an extender pigment, such as talc or mica.

The thickness of the light blocking layer 7 is preferably substantially the same as the thickness of the light transmissive layer 6. The thickness of the light blocking layer 7 being substantially the same as the thickness of the light transmissive layer 6 means that the absolute value of the thickness difference between the light blocking layer 7 and the light transmissive layer 6 is 10 µm or less. However, the thickness of the light blocking layer 7 may be different from the thickness of the light transmissive layer 6. The thickness of the light blocking layer 7 is not particularly limited, but is preferably not less than 10 µm, more preferably not less than 50 µm, preferably not more than 500 µm, and more preferably not more than 100 µm. When the thickness of the light blocking layer 7 is equal to or larger than the above-described lower limit, the hideability of the internal structure of the cooking device can be further increased. On the other hand, when the thickness of the light blocking layer 7 is equal to or smaller than the above-described upper limit, this can make the light blocking layer 7 more difficult to peel due to a difference in coefficient of thermal expansion from the dielectric multi-layer 3.

In this embodiment, on the dielectric multi-layer 3 provided on the underside surface 2b of the glass substrate 2, the light transmissive layer 6 is provided on a portion of the dielectric multi-layer 3 overlapped with the displaying region A in plan view and the light blocking layer 7 is provided on a portion of the dielectric multi-layer 3 overlapped with the non-displaying region B in plan view. Particularly, the absolute value of the difference in refractive index at a wavelength of 550 nm between the light transmissive layer 6 and the light blocking layer 7 is 0.1 or less. Thus, during turn-off, the boundary between the displaying region A and the non-displaying region B can be made less visible while the internal structure of the cooking device is hidden. In this relation, a detailed description will be given with reference to FIGS. 2 and 7.

Figure 2:
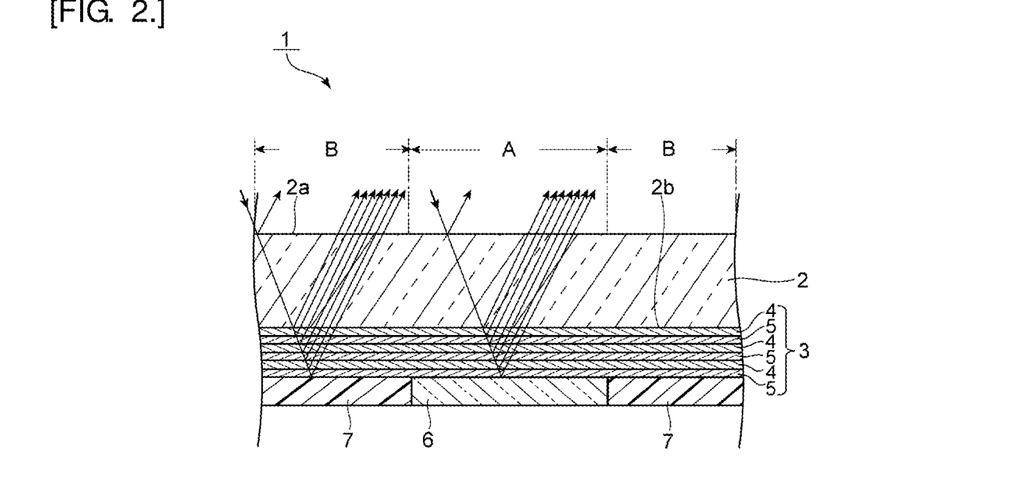
FIG. 2 is a schematic cross-sectional view for illustrating an effect of the top plate for a cooking device according to the first embodiment of the present invention during turn-off.
Figure 7:
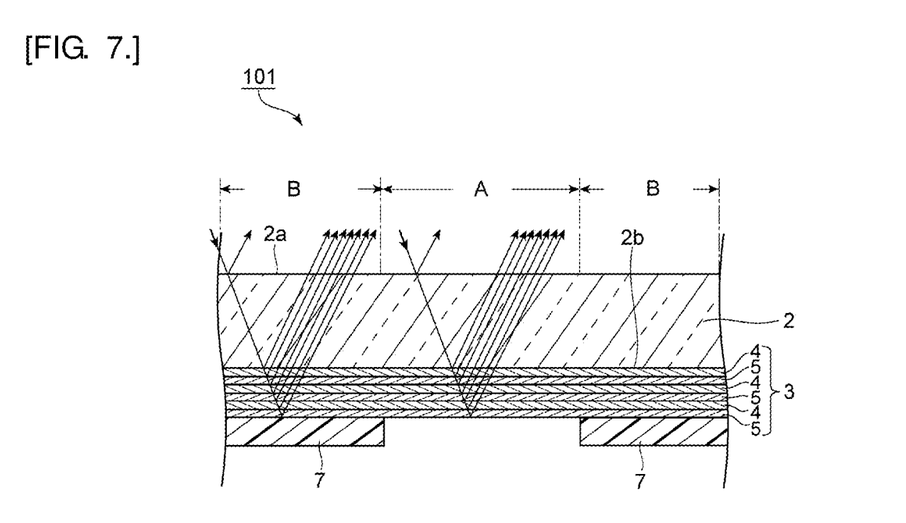
FIG. 7 is a schematic cross-sectional view showing a top plate for a cooking device in a comparative example.

FIG. 2 is a schematic cross-sectional view for illustrating an effect of the top plate for a cooking device according to the first embodiment of the present invention during turn-off. Furthermore, FIG. 7 is a schematic cross-sectional view showing a top plate for a cooking device in a comparative example. As shown in FIG. 7, a top plate 101 in the comparative example is provided with no light transmissive layer 6.

As shown in FIGS. 2 and 7, when the dielectric multi-layer 3 is provided on the underside surface 2b of the glass substrate 2, it is possible that the indication in the displaying region A is made clearly visible during turn-on of the display 32 and, at the same time, the internal structure of the cooking device is hidden during turn-off of the display 32.

However, the inventor found that when no light transmissive layer 6 is provided as with the top plate 101 for a cooking device in the comparative example shown in FIG. 7, a difference in reflectance spectrum occurs between the displaying region A and the non-displaying region B. Furthermore, the inventor conducted intensive studies on causes for the above difference and, as a result, found that for the reason that the dielectric multi-layer 3 is in contact with the light blocking layer 7 in the non-displaying region B, but it is in contact with air in the displaying region A, a difference in refractive index between the light blocking layer 7 and air causes the above difference in reflectance spectrum.

Unlike the above, in this embodiment, the light transmissive layer 6 is provided on a portion of the dielectric multi-layer 3 overlapped with the displaying region A. Particularly, the absolute value of the difference in refractive index at a wavelength of 550 nm between the light transmissive layer 6 and the light blocking layer 7 is 0.1 or less. Therefore, the difference in reflectance spectrum between the displaying region A and the non-displaying region B can be made small. Hence, during turn-off of the display 32, the differences in lightness and chromaticity between the displaying region A and the non-displaying region B can be made small. As a result, the boundary between the displaying region A and the non-displaying region B can be made difficult to see.

From the perspective of making the boundary between the displaying region A and the non-displaying region B more difficult to see, the absolute value of the difference in refractive index at a wavelength of 550 nm between the light transmissive layer 6 and the light blocking layer 7 is preferably 0.05 or less, and more preferably 0.03 or less. However, the light transmissive layer 6 and the light blocking layer 7 may have the same refractive index at a wavelength of 550 nm.

The refractive index of the light transmissive layer 6 at a wavelength of 550 nm is, for example, not less than 1.46 and not more than 1.60. The refractive index of the light blocking layer 7 at a wavelength of 550 nm is, for example, not less than 1.46 and not more than 1.60.

In this embodiment, the absolute value of the difference in lightness (L*) between the displaying region A and the non-displaying region B is 5 or less and the absolute value of the difference in chroma (C*) between them is 1 or less. The lightness (L*) and chroma (C*) used herein refer to, in the L*a*b* color system employed in JIS Z 8781-4: 2013, a lightness (L*) and a chroma (C*) of reflected light from the top plate when light of a D65 light source is applied to the cooking surface of the top plate. The chroma (C*) is determined from the chromaticity (a* and b*) and expressed by $C^* = ((a^*)^2 + (b^*)^2)^{1/2}$. When the absolute value is equal to or smaller than the above-described upper limit, the boundary between the displaying region A and the non-displaying region B can be made difficult to see.

From the perspective of making the boundary between the displaying region A and the non-displaying region B more difficult to see, the absolute value of the difference in lightness (L*) between the displaying region A and the non-displaying region B is preferably 3 or less and more preferably 1 or less. Furthermore, the absolute value of the difference in chroma (C*) between the displaying region A and the non-displaying region B is preferably 0.7 or less and more preferably 0.4 or less.

Moreover, the absolute value of the difference in average value of reflectances at wavelengths of 400 nm to 700 nm between the displaying region A and the non-displaying region B is preferably 5 or less, more preferably 2 or less, and still more preferably 1 or less. However, the displaying region A and the non-displaying region B may have the same average value of reflectances at wavelengths of 400 nm to 700 nm.

(Production Method)

The top plate 1 can be produced, for example, by the following production method.

First, a dielectric multi-layer 3 is formed on the underside surface 2b of a glass substrate 2. The dielectric multi-layer 3 can be formed by an appropriate method, such as the vacuum deposition method or sputtering.

Next, a light transmissive layer 6 and a light blocking layer 7 are formed on the dielectric multi-layer 3. Specifically, first, a portion of the dielectric multi-layer 3 to coincide with a displaying region A is masked and a light blocking layer 7 is formed on a portion of the dielectric multi-layer 3 to coincide with a non-displaying region B. Next, a light transmissive layer 6 is formed on the portion of the dielectric multi-layer 3 to coincide with the displaying region A. Alternatively, it is possible that after the non-displaying region B is masked and the light transmissive layer 6 is first formed in the displaying region A, the light blocking layer 7 is formed in the non-displaying region B.

The light transmissive layer 6 can be formed, for example, by preparing a paste containing a transparent resin and a solvent, applying the paste on the dielectric multi-layer 3, and then drying the paste. The light transmissive layer 8 is preferably an all-over coating film obtained by continuously and uniformly applying the paste. An example that can be used as a method for applying the paste is screen printing. Masking can be implemented by providing a mask on a screen printing plate for use in printing.

The method for forming the light blocking layer 7 is not particularly limited and, for example, the light blocking layer 7 can be formed by applying a paste containing a resin, a coloring pigment powder, and a solvent and drying the paste. Also in this case, screen printing can be used as a method for applying the paste. Furthermore, from the perspective of further increasing the hideability of the internal structure of the cooking device, the light blocking layer 7 is also preferably an all-over coating film obtained by continuously and uniformly applying the paste.

The drying temperature for the paste in forming the light transmissive layer 6 and the light blocking layer 7 may be, for example, not lower than 50° C. and not higher than 150° C. The drying time may be, for example, not less than ten minutes and not more than five hours.

A layered body where the light transmissive layer 6 and the light blocking layer 7 are formed may be further fired. The light transmissive layer 6 and the light blocking layer 7 may be separately fired. The firing temperature in each process is not particularly limited, but it is preferably 400° C. or higher and more preferably 500° C. or higher. Furthermore, the firing temperature is preferably not higher than 900° C. and more preferably not higher than 850° C.

In the above manner, the top plate 1 can be produced.

Second Embodiment

Figure 3:
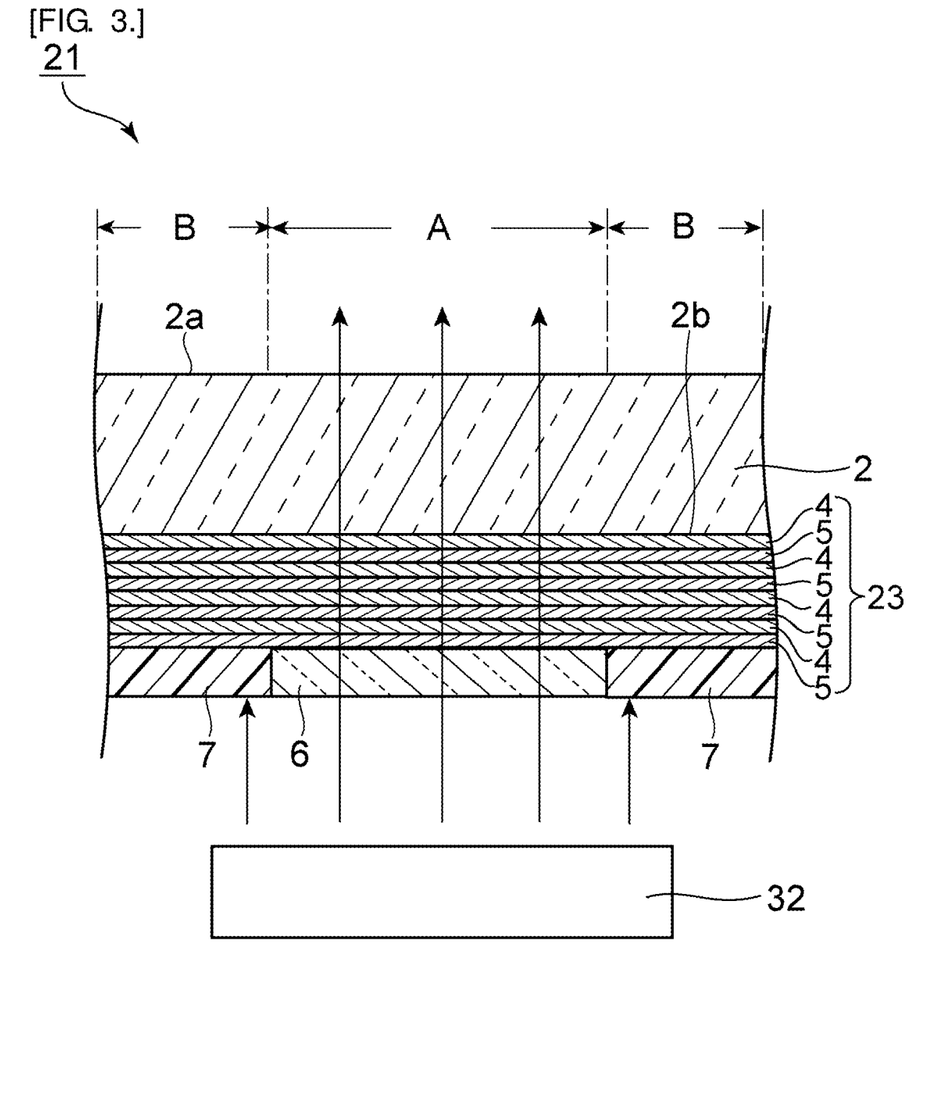
FIG. 3 is a schematic cross-sectional view showing a top plate for a cooking device according to a second embodiment of the present invention.

FIG. 3 is a schematic cross-sectional view showing a top plate for a cooking device according to a second embodiment of the present invention. As shown in FIG. 3, in a top plate 21 for a cooking device (hereinafter, the "top plate 21 for a cooking device" is referred to simply as the "top plate 21"), the number of layers forming a dielectric multi-layer 23 is eight. Specifically, the dielectric multi-layer 23 is an eight-layered film formed so that low-refractive index films 4 made of $SiO_2$ and high-refractive index films 5 made of $Nb_2O_5$ are layered alternately in this order on the underside surface 2b of a glass substrate 2. The rest is the same as in the first embodiment.

Also in the top plate 21, on the dielectric multi-layer 23 provided on the underside surface 2b of the glass substrate 2, a light transmissive layer 6 is provided on a portion of the dielectric multi-layer 23 overlapped with the displaying region A in plan view and a light blocking layer 7 is provided on a portion of the dielectric multi-layer 23 overlapped with the non-displaying region B in plan view. Particularly, the absolute value of the difference in refractive index at a wavelength of 550 nm between the light transmissive layer 6 and the light blocking layer 7 is 0.1 or less. Thus, the top plate 21 makes the indication in the displaying region A clearly visible during turn-on of the display 32 and, during turn-off of the display 32, makes the boundary between the displaying region A and the non-displaying region B less visible while hiding the internal structure of the cooking device.

As an alternative, the absolute value of the difference in lightness (L*) between the displaying region A and the non-displaying region B is 5 or less and the absolute value of the difference in chroma (C*) between them is 1 or less. Thus, the top plate makes the indication in the displaying region A clearly visible during turn-on of the display 32 and, during turn-off of the display 32, makes the boundary between the displaying region A and the non-displaying region B less visible while hiding the internal structure of the cooking device.

As with the top plate 21, the number of layers forming the dielectric multi-layer 23 may be eight. In the present invention, the number of layers forming the dielectric multi-layer is preferably not less than 4, more preferably not less than 6, preferably not more than 16, and more preferably not more than 12. When the number of layers forming the dielectric multi-layer is in the above range, the indication in the displaying region A can be made more clearly visible during turn-on of the display 32 and the internal structure of the cooking device can be more certainly hidden during turn-off of the display 32.

[Display-Attached Top Plate for Cooking Device]

Figure 4:
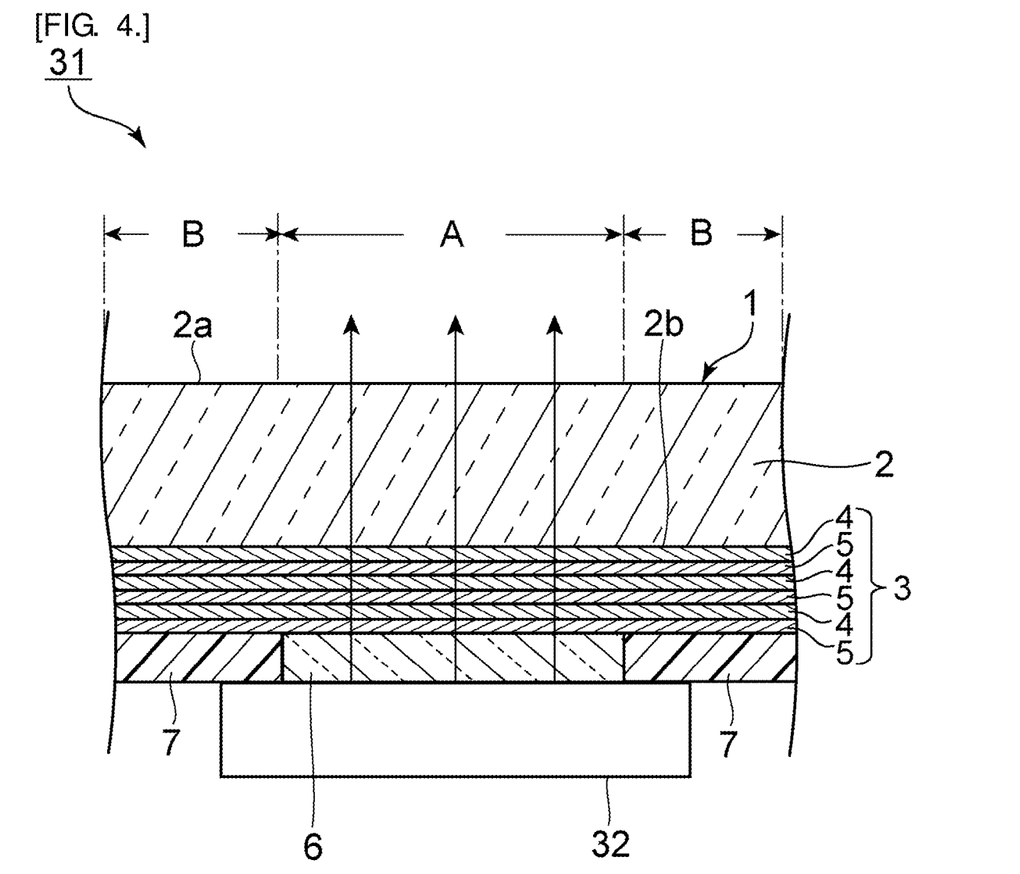
FIG. 4 is a schematic cross-sectional view showing a display-attached top plate for a cooking device according to an embodiment of the present invention.

FIG. 4 is a schematic cross-sectional view showing a display-attached top plate for a cooking device according to an embodiment of the present invention. As shown in FIG. 4, a display-attached top plate 31 for a cooking device includes a top plate 1 for a cooking device and a display 32. In this embodiment, the light transmissive layer 6 of the top plate 1 for a cooking device further serves as an adhesive layer. In addition, an unshown cover glass for the display 32 is bonded directly to the light transmissive layer 6 of the top plate 1 for a cooking device.

Since the display-attached top plate 31 for a cooking device in this embodiment includes the top plate 1 for a cooking device, it makes the indication in the displaying region A clearly visible during turn-on of the display 32 and, during turn-off of the display 32, makes the boundary between the displaying region A and the non-displaying region B less visible while hiding the internal structure of the cooking device.

Furthermore, in the display-attached top plate 31 for a cooking device, the surface of the light transmissive layer 6 is in contact, not with air, but with the cover glass for the display 32. In this case, the refractive index of the light transmissive layer 6 can be more approximate to the refractive index of the cover glass for the display 32 than the refractive index of air. Therefore, the reflection from the surface of the light transmissive layer 6 opposite to the dielectric multi-layer 3 can also be reduced. Thus, the display region A and the non-displaying region B can further approximate each other in terms of lightness and chromaticity, so that the boundary between the displaying region A and the non-displaying region B can be made more difficult to see.

From the perspective of making the boundary between the displaying region A and the non-displaying region B more difficult to see, the absolute value of the difference in refractive index at a wavelength of 550 nm between the light transmissive layer 6 and the cover glass for the display 32 is preferably 0.1 or less, and more preferably 0.05 or less. However, the light transmissive layer 6 and the cover glass for the display 32 may have the same refractive index. The refractive index of the cover glass for the display 32 at a wavelength of 550 nm is, for example, not less than 1.5 and not more than 1.55. Moreover, the absolute value of the difference in average value of reflectances at wavelengths of 400 nm to 700 nm between the displaying region A and the non-displaying region B is preferably 5 or less, more preferably 2 or less, and still more preferably 1 or less.

The cover glass for the display 32 need not necessarily be bonded directly to the light transmissive layer 6 and may be bonded indirectly to the light transmissive layer 6 through any other adhesive glue or pressure-sensitive adhesive. Also in this case, the difference in refractive index from the light transmissive layer 6 can be made smaller than when in contact with air, so that the boundary between the displaying region A and the non-displaying region B can be made more difficult to see during turn-off of the display 32.

Hereinafter, a description will be given in further detail of the present invention with reference to examples. However, the following examples are merely illustrative. The present invention is not at all limited by the following examples.

Example 1

In Example 1, a top plate 1 shown in FIG. 1 was produced.

First, a dielectric multi-layer 3 was produced, by sputtering, on the underside surface 2b of a clear crystallized glass plate (manufactured by Nippon Electric Glass Co., Ltd., trade name: "N-0", average coefficient of linear thermal expansion at 30° C. to 750° C.: $0.5 \times 10^{-7}$/° C., thickness: 4 mm) serving as a glass substrate 2. Specifically, a dielectric multi-layer 3 was produced on the underside surface 2b of the glass substrate 2 so that $SiO_2$ (50.3 nm), $Nb_2O_5$ (21.7 nm), $SiO_2$ (38.3 nm), $Nb_2O_5$ (31.6 nm), $SiO_2$ (90.7 nm), and $Nb_2O_5$ (45.2 nm) were provided in this order on the underside surface 2b.

Next, a silicone resin, a black pigment, and a solvent were mixed to prepare a paste for forming a light blocking layer.

Next, the paste for forming a light blocking layer was screen printed on a portion of the dielectric multi-layer 3 overlapped with a non-displaying region B to have a thickness of 20 μm, thus forming a light blocking layer 7 (with a refractive index of 1.47 at a wavelength of 550 nm). Furthermore, a mask was provided on a screen printing plate for use in printing so that a displaying region A was masked. Next, a paste (SVR1150 manufactured by Dexerials Corporation) for forming a light transmissive layer was screen printed on the dielectric multi-layer 3 to have a thickness of 20 μm and then irradiated with ultraviolet rays to form a light transmissive layer 6 having a refractive index of 1.50 at a wavelength of 550 nm, thus obtaining a top plate 1 having a reflectance of 36.4%. As described previously, the absolute value of the difference in refractive index between the light transmissive layer 6 and the light blocking layer 7 is 0.1 or less.

Comparative Example 1

In Comparative Example 1, a top plate was produced in the same manner as in Example 1 except that no light transmissive layer 6 was formed.

Figure 5:
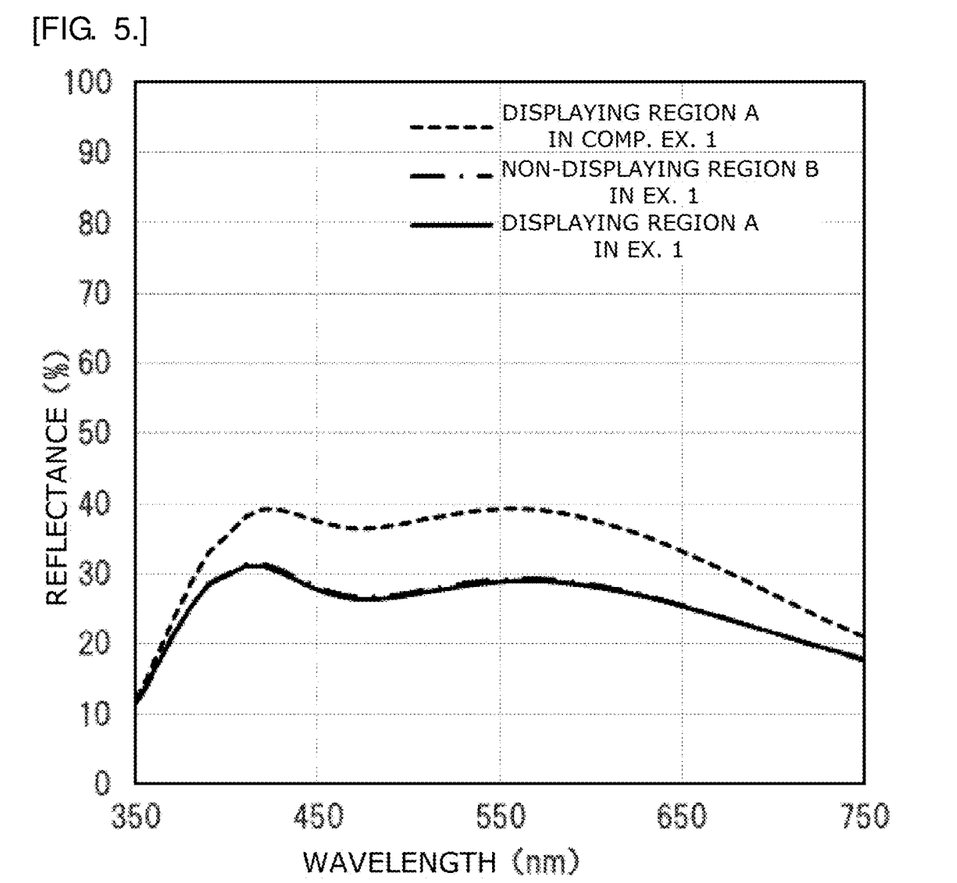
FIG. 5 is a graph showing reflectance spectra of respective top plates for cooking devices in Example 1 and Comparative Example 1.

FIG. 5 is a graph showing reflectance spectra of respective top plates for cooking devices in Example 1 and Comparative Example 1. In FIG. 5, the reflectance spectrum in the displaying region A in Example 1, the reflectance spectrum in the non-displaying region B in Example 1, and the reflectance spectrum in the displaying region A in Comparative Example 1 are shown by the solid line, the dash-single-dot line, and the broken line, respectively.

As shown in FIG. 5, it was confirmed that there was substantially no difference in reflectance spectrum between the displaying region A and the non-displaying region B in Example 1. On the other hand, the reflectance spectrum in the displaying region A in Comparative Example 1 was significantly different from the reflectance spectrum in the non-displaying region B in Example 1.

The average values of reflectances at wavelengths of 400 nm to 700 nm were as shown in Table 1 below.

TABLE 1

| | Example 1 | Comparative Example 1 |
|---|---|---|
| Displaying Region | 27.1% | 36.4% |
| Non-Displaying Region | 27.6% | 27.6% |

Furthermore, using a colorimeter ("CM2600d" manufactured by Konica Minolta, Inc.), reflected light from the displaying region A and non-displaying region B of the top plate in Example 1 and the displaying region A of the top plate in Comparative Example 1 when irradiated with light of a D65 light source was evaluated in terms of lightness (L*), chromaticity (a* and b*), and chroma (C*) in the L*a*b* color system. The chroma is expressed by $C^* = ((a^*)^2 + (b^*)^2)^{1/2}$.

The results are shown in Table 2 below.

TABLE 2

|  |  | Example 1 | Comparative Example 1 |
|---|---|---|---|
| Displaying Region | L* | 60.0 | 68.1 |
|  | a* | 0.0 | −1.6 |
|  | b* | 0.0 | 0.6 |
|  | C* | 0.0 | 1.7 |
| Non-Displaying Region | L* | 60.3 | 60.3 |
|  | a* | −0.1 | −0.1 |
|  | b* | −0.1 | −0.1 |
|  | C* | 0.1 | 0.1 |
| ΔL* |  | 0.3 | 7.8 |
| ΔC* |  | 0.1 | 1.6 |

It was confirmed from Table 2 that, by providing the light transmissive layer 6 in the displaying region A, the absolute value of the difference in lightness L* from the non-displaying region B could be reduced from 7.8 to as small as 0.3 and the absolute value of the difference in chroma C* from the non-displaying region B could be reduced from 1.6 to as small as 0.1, so that the boundary between the displaying region A and the non-displaying region B during turn-off of the display 32 could be made more difficult to see.

Furthermore, the top plate for a cooking device in Example 1 was visually confirmed to be capable of making the indication in the displaying region A clearly visible during turn-on of the display 32 and, during turn-off of the display 32, capable of making the boundary between the displaying region A and the non-displaying region B less visible while hiding the internal structure of the cooking device. On the other hand, in the top plate for a cooking device in Comparative Example 1, the boundary between the displaying region A and the non-displaying region B was recognized during turn-off of the display 32.

Example 2

In Example 2, a top plate 21 shown in FIG. 3 was produced.

Specifically, a top plate was produced in the same manner as in Example 1 except that a dielectric multi-layer 23 was produced on the underside surface 2b of a glass substrate 2 so that $SiO_2$ (50 nm), $Nb_2O_5$ (17.5 nm), $SiO_2$ (69.4 nm), $Nb_2O_5$ (15 nm), $SiO_2$ (130 nm), $Nb_2O_5$ (38.5 nm), $SiO_2$ (93.8 nm), and $Nb_2O_5$ (80 nm) were provided in this order on the underside surface 2b. Therefore, also in Example 2, the absolute value of the difference in refractive index between the light transmissive layer 6 and the light blocking layer 7 is 0.1 or less.

Comparative Example 2

In Comparative Example 2, a top plate was produced in the same manner as in Example 2 except that no light transmissive layer 6 was formed.

Figure 6:
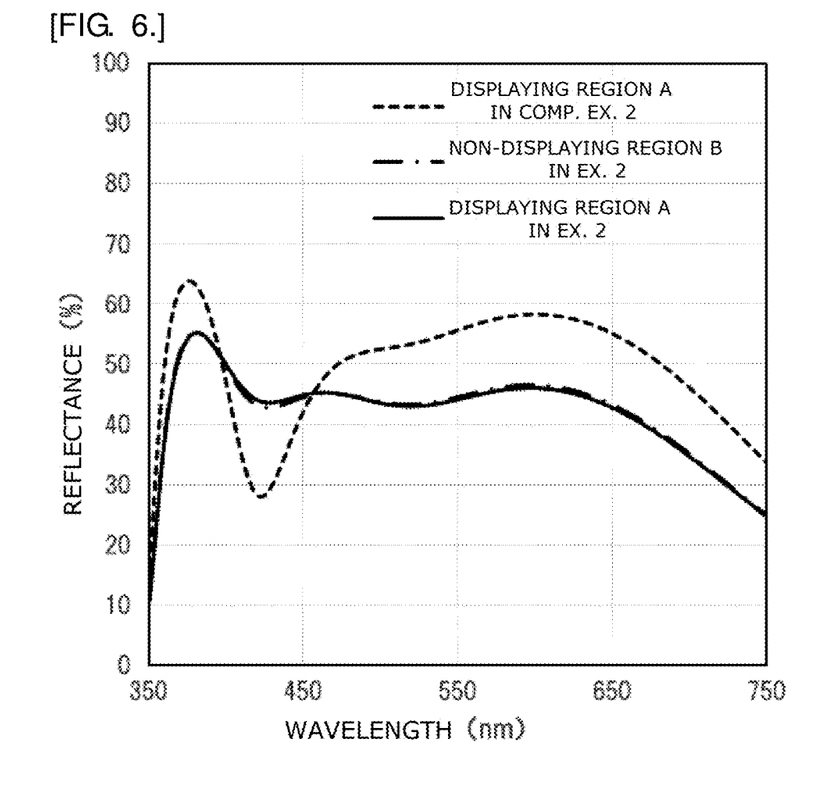
FIG. 6 is a graph showing reflectance spectra of respective top plates for cooking devices in Example 2 and Comparative Example 2.

FIG. 6 is a graph showing reflectance spectra of respective top plates for cooking devices in Example 2 and Comparative Example 2. In FIG. 6, the reflectance spectrum in the displaying region A in Example 2, the reflectance spectrum in the non-displaying region B in Example 2, and the reflectance spectrum in the displaying region A in Comparative Example 2 are shown by the solid line, the dash-single-dot line, and the broken line, respectively.

As shown in FIG. 6, it was confirmed that there was substantially no difference in reflectance spectrum between the displaying region A and the non-displaying region B in Example 2. On the other hand, the reflectance spectrum in the displaying region A in Comparative Example 2 was significantly different from the reflectance spectrum in the non-displaying region B in Example 2.

The average values of reflectances at wavelengths of 400 nm to 700 nm were as shown in Table 3 below.

TABLE 3

|  | Example 2 | Comparative Example 2 |
|---|---|---|
| Displaying Region | 43.6% | 50.5% |
| Non-Displaying Region | 43.9% | 43.9% |

Furthermore, using a colorimeter ("CM2600d" manufactured by Konica Minolta, Inc.), reflected light from the displaying region A and non-displaying region B of the top plate in Example 2 and the displaying region A of the top plate in Comparative Example 2 when irradiated with light of a D65 light source was evaluated in terms of lightness (L*), chromaticity (a and b*), and chroma (C*) in the L*a*b* color system.

The results are shown in Table 4 below.

TABLE 4

|  |  | Example 2 | Comparative Example 2 |
|---|---|---|---|
| Displaying Region | L* | 72.6 | 79.3 |
|  | a* | 1.4 | −3.8 |
|  | b* | −0.2 | 13.9 |
|  | C* | 1.4 | 14.4 |
| Non-Displaying Region | L* | 72.9 | 72.9 |
|  | a* | 1.1 | 1.1 |
|  | b* | 0.6 | 0.6 |
|  | C* | 1.3 | 1.3 |
| ΔL* |  | 0.3 | 6.4 |
| ΔC* |  | 0.1 | 13.1 |

It was confirmed from Table 4 that, by providing the light transmissive layer 6 in the displaying region A, the absolute value of the difference in lightness L* from the non-displaying region B could be reduced from 6.4 to as small as 0.3 and the absolute value of the difference in chroma from the non-displaying region B could be reduced from 13.1 to as small as 0.1, so that the boundary between the displaying region A and the non-displaying region B during turn-off of the display 32 could be made more difficult to see.

Furthermore, the top plate for a cooking device in Example 2 was visually confirmed to be capable of making the indication in the displaying region A clearly visible during turn-on of the display 32 and, during turn-off of the display 32, capable of making the boundary between the displaying region A and the non-displaying region B less visible while hiding the internal structure of the cooking device. On the other hand, in the top plate for a cooking device in Comparative Example 2, the boundary between the displaying region A and the non-displaying region B was recognized during turn-off of the display 32.

Example 3

In Example 3, a top plate was produced in the same manner as in Example 1 except that a dielectric multi-layer was produced on the underside surface 2b of a glass substrate 2 so that $Nb_2O_5$ (24.6 nm), $SiO_2$ (100.9 nm), $Nb_2O_5$ (39.4 nm), $SiO_2$ (65.0 nm), $Nb_2O_5$ (51.4 nm), $SiO_2$ (101.7 nm), $Nb_2O_5$ (65.5 nm), $SiO_2$ (113.6 nm), $Nb_2O_5$ (72.2 nm), $SiO_2$ (117.8 nm), and $Nb_2O_5$ (86.9 nm) were provided in this order on the underside surface 2b. Therefore, also in Example 3, the absolute value of the difference in refractive index between the light transmissive layer 6 and the light blocking layer 7 is 0.1 or less.

Comparative Example 3

In Comparative Example 3, a top plate was produced in the same manner as in Example 3 except that no light transmissive layer 6 was formed.

Figure 8:
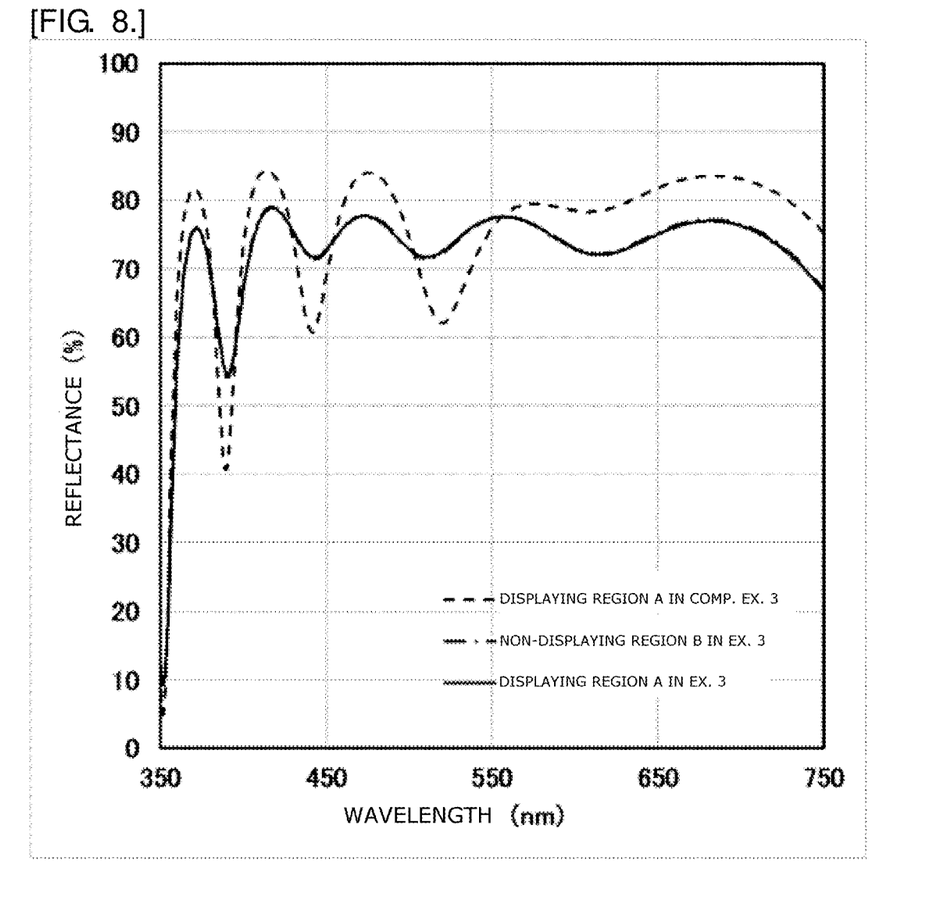
FIG. 8 is a graph showing reflectance spectra of respective top plates for cooking devices in Example 3 and Comparative Example 3.

FIG. 8 is a graph showing reflectance spectra of respective top plates for cooking devices in Example 3 and Comparative Example 3. In FIG. 8, the reflectance spectrum in the displaying region A in Example 3, the reflectance spectrum in the non-displaying region B in Example 3, and the reflectance spectrum in the displaying region A in Comparative Example 3 are shown by the solid line, the dash-single-dot line, and the broken line, respectively.

As shown in FIG. 8, it was confirmed that there was substantially no difference in reflectance spectrum between the displaying region A and the non-displaying region B in Example 3. On the other hand, the reflectance spectrum in the displaying region A in Comparative Example 3 was significantly different from the reflectance spectrum in the non-displaying region B in Example 3.

The average values of reflectances at wavelengths of 400 nm to 700 nm were as shown in Table 5 below.

TABLE 5

| | Example 3 | Comparative Example 3 |
|---|---|---|
| Displaying Region | 75.0% | 77.4% |
| Non-Displaying Region | 75.1% | 75.1% |

Furthermore, using a colorimeter ("CM2600d" manufactured by Konica Minolta, Inc.), reflected light from the displaying region A and non-displaying region B of the top plate in Example 3 and the displaying region A of the top plate in Comparative Example 3 when irradiated with light of a D65 light source was evaluated in terms of lightness (L*), chromaticity (a and b*), and chroma (C*) in the L*a*b* color system.

The results are shown in Table 6 below.

TABLE 6

| | | Example 3 | Comparative Example 3 |
|---|---|---|---|
| Displaying Region | L* | 89.4 | 89.4 |
| | a* | −0.9 | 5.1 |
| | b* | 0.1 | 0.3 |
| | C* | 0.9 | 5.1 |
| Non-Displaying Region | L* | 89.4 | 89.4 |
| | a* | −0.7 | −0.7 |
| | b* | 0.1 | 0.1 |
| | C* | 0.7 | 0.7 |
| ΔL* | | 0.0 | 0.0 |
| ΔC* | | 0.2 | 4.4 |

It was confirmed from Table 6 that, by providing the light transmissive layer 6 in the displaying region A, the absolute value of the difference in chroma from the non-displaying region B could be reduced from 4.4 to as small as 0.2, so that the boundary between the displaying region A and the non-displaying region B during turn-off of the display 32 could be made more difficult to see.

Furthermore, the top plate for a cooking device in Example 3 was visually confirmed to be capable of making the indication in the displaying region A clearly visible during turn-on of the display 32 and, during turn-off of the display 32, capable of making the boundary between the displaying region A and the non-displaying region B less visible while hiding the internal structure of the cooking device. On the other hand, in the top plate for a cooking device in Comparative Example 3, the boundary between the displaying region A and the non-displaying region B was recognized during turn-off of the display 32.

Example 4

In Example 4, a top plate was produced in the same manner as in Example 1 except that a dielectric multi-layer was produced on the underside surface 2b of a glass substrate 2 so that $Nb_2O_5$ (72.0 nm), $SiO_2$ (15.4 nm), $Nb_2O_5$ (59.3 nm), $SiO_2$ (106.9 nm), $Nb_2O_5$ (47.9 nm), $SiO_2$ (79.5 nm), $Nb_2O_5$ (97.8 nm), $SiO_2$ (95.7 nm), and $Nb_2O_5$ (97.7 nm) were provided in this order on the underside surface 2b. Therefore, also in Example 4, the absolute value of the difference in refractive index between the light transmissive layer 6 and the light blocking layer 7 is 0.1 or less.

Comparative Example 4

In Comparative Example 4, a top plate was produced in the same manner as in Example 4 except that no light transmissive layer 6 was formed.

Figure 9:
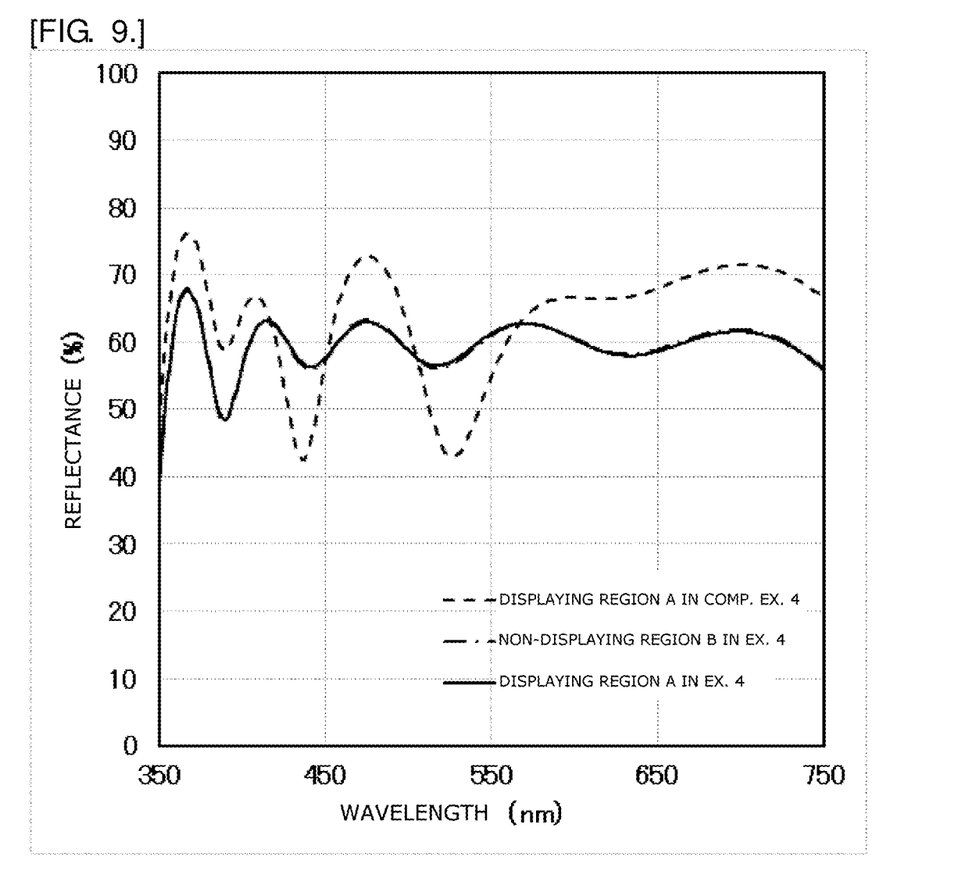
FIG. 9 is a graph showing reflectance spectra of respective top plates for cooking devices in Example 4 and Comparative Example 4.

FIG. 9 is a graph showing reflectance spectra of respective top plates for cooking devices in Example 4 and Comparative Example 4. In FIG. 9, the reflectance spectrum in the displaying region A in Example 4, the reflectance spectrum in the non-displaying region B in Example 4, and the reflectance spectrum in the displaying region A in Comparative Example 4 are shown by the solid line, the dash-single-dot line, and the broken line, respectively.

As shown in FIG. 9, it was confirmed that there was substantially no difference in reflectance spectrum between the displaying region A and the non-displaying region B in Example 4. On the other hand, the reflectance spectrum in the displaying region A in Comparative Example 4 was significantly different from the reflectance spectrum in the non-displaying region B in Example 4.

The average values of reflectances at wavelengths of 400 nm to 700 nm were as shown in Table 7 below.

TABLE 7

| | Example 4 | Comparative Example 4 |
|---|---|---|
| Displaying Region | 60.0% | 62.3% |
| Non-Displaying Region | 60.0% | 60.0% |

Furthermore, using a colorimeter ("CM2600d" manufactured by Konica Minolta, Inc.), reflected light from the displaying region A and non-displaying region B of the top plate in Example 4 and the displaying region A of the top plate in Comparative Example 4 when irradiated with light of a D65 light source was evaluated in terms of lightness (L*), chromaticity (a and b*), and chroma (C*) in the L*a*b* color system.

The results are shown in Table 8 below.

TABLE 8

|  |  | Example 4 | Comparative Example 4 |
|---|---|---|---|
| Displaying Region | L* | 81.9 | 81 |
|  | a* | 0.2 | 10.2 |
|  | b* | 0.5 | −1.2 |
|  | C* | 0.5 | 10.2 |
| Non-Displaying Region | L* | 81.8 | 81.8 |
|  | a* | 0.5 | 0.5 |
|  | b* | 0.4 | 0.4 |
|  | C* | 0.7 | 0.7 |
| ΔL* |  | 0.1 | 0.8 |
| ΔC* |  | 0.2 | 9.6 |

It was confirmed from Table 8 that, by providing the light transmissive layer 6 in the displaying region A, the absolute value of the difference in lightness L* from the non-displaying region B could be reduced from 0.8 to as small as 0.1 and the absolute value of the difference in chroma from the non-displaying region B could be reduced from 9.6 to as small as 0.2, so that the boundary between the displaying region A and the non-displaying region B during turn-off of the display 32 could be made more difficult to see.

Furthermore, the top plate for a cooking device in Example 4 was visually confirmed to be capable of making the indication in the displaying region A clearly visible during turn-on of the display 32 and, during turn-off of the display 32, capable of making the boundary between the displaying region A and the non-displaying region B less visible while hiding the internal structure of the cooking device. On the other hand, in the top plate for a cooking device in Comparative Example 4, the boundary between the displaying region A and the non-displaying region B was recognized during turn-off of the display 32.

Example 5

In Example 5, a top plate was produced in the same manner as in Example 1 except that a dielectric multi-layer was produced on the underside surface 2b of a glass substrate 2 so that $SiO_2$ (50.0 nm), $Nb_2O_5$ (6.1 nm), $SiO_2$ (79.3 nm), $Nb_2O_5$ (6.7 nm), $SiO_2$ (126.8 nm), and $Nb_2O_5$ (61.8 nm) were provided in this order on the underside surface 2b. Therefore, also in Example 5, the absolute value of the difference in refractive index between the light transmissive layer 6 and the light blocking layer 7 is 0.1 or less.

Comparative Example 5

In Comparative Example 5, a top plate was produced in the same manner as in Example 5 except that no light transmissive layer 6 was formed.

Figure 10:
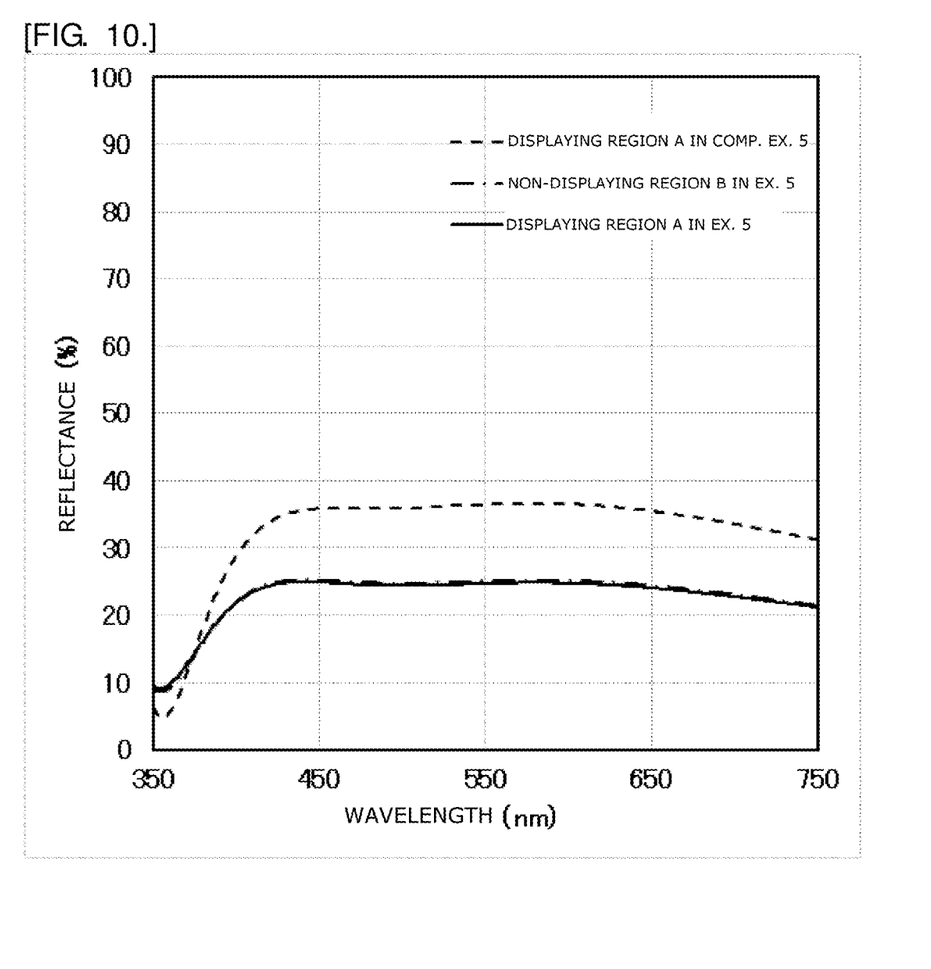
FIG. 10 is a graph showing reflectance spectra of respective top plates for cooking devices in Example 5 and Comparative Example 5.

FIG. 10 is a graph showing reflectance spectra of respective top plates for cooking devices in Example 5 and Comparative Example 5. In FIG. 10, the reflectance spectrum in the displaying region A in Example 5, the reflectance spectrum in the non-displaying region B in Example 5, and the reflectance spectrum in the displaying region A in Comparative Example 5 are shown by the solid line, the dash-single-dot line, and the broken line, respectively.

As shown in FIG. 10, it was confirmed that there was substantially no difference in reflectance spectrum between the displaying region A and the non-displaying region B in Example 5. On the other hand, the reflectance spectrum in the displaying region A in Comparative Example 5 was significantly different from the reflectance spectrum in the non-displaying region B in Example 5.

The average values of reflectances at wavelengths of 400 nm to 700 nm were as shown in Table 9 below.

TABLE 9

|  | Example 5 | Comparative Example 5 |
|---|---|---|
| Displaying Region | 24.3% | 35.5% |
| Non-Displaying Region | 24.7% | 24.7% |

Furthermore, using a colorimeter ("CM2600d" manufactured by Konica Minolta, Inc.), reflected light from the displaying region A and non-displaying region B of the top plate in Example 5 and the displaying region A of the top plate in Comparative Example 5 when irradiated with light of a D65 light source was evaluated in terms of lightness (L*), chromaticity (a and b*), and chroma (C*) in the L*a*b* color system.

The results are shown in Table 10 below.

TABLE 10

|  |  | Example 5 | Comparative Example 5 |
|---|---|---|---|
| Displaying Region | L* | 56.7 | 66.8 |
|  | a* | 0.1 | −0.5 |
|  | b* | −0.1 | 1.1 |
|  | C* | 0.1 | 1.2 |
| Non-Displaying Region | L* | 57.1 | 57.1 |
|  | a* | 0.0 | 0.0 |
|  | b* | 0.0 | 0.0 |
|  | C* | 0.0 | 0.0 |
| ΔL* |  | 0.4 | 9.7 |
| ΔC* |  | 0.2 | 1.2 |

It was confirmed from Table 10 that, by providing the light transmissive layer 6 in the displaying region A, the absolute value of the difference in lightness L* from the non-displaying region B could be reduced from 9.7 to as small as 0.4 and the absolute value of the difference in chroma from the non-displaying region B could be reduced from 1.2 to as small as 0.1, so that the boundary between the displaying region A and the non-displaying region B during turn-off of the display 32 could be made more difficult to see.

Furthermore, the top plate for a cooking device in Example 5 was visually confirmed to be capable of making the indication in the displaying region A clearly visible during turn-on of the display 32 and, during turn-off of the display 32, capable of making the boundary between the displaying region A and the non-displaying region B less visible while hiding the internal structure of the cooking device. On the other hand, in the top plate for a cooking device in Comparative Example 5, the boundary between the displaying region A and the non-displaying region B was recognized during turn-off of the display 32.

REFERENCE SIGNS LIST

1 . . . top plate for cooking device
2 . . . glass substrate
2a . . . cooking surface
2b . . . underside surface
3 . . . dielectric multi-layer
4 . . . low-refractive index film
5 . . . high-refractive index film
6 . . . light transmissive layer
7 . . . light blocking layer 21 . . . top plate for cooking device
23 . . . dielectric multi-layer
31 . . . display-attached top plate for cooking device
32 . . . display

The invention claimed is:

1. A top plate for a cooking device that includes a displaying region capable of showing information given from a display and a non-displaying region blocking visible light, the top plate comprising:
   a glass substrate having a cooking surface on which a utensil is to be put and an underside surface opposite to the cooking surface;
   a dielectric multi-layer provided on the underside surface of the glass substrate;
   a light transmissive layer provided on a portion of the dielectric multi-layer overlapped with the displaying region and containing a transparent material; and
   a light blocking layer provided on a portion of the dielectric multi-layer overlapped with the non-displaying region,
   wherein the top plate has a reflectance in a range of 40% to 80%, and
   an absolute value of a difference in refractive index between the light transmissive layer and the light blocking layer is 0.1 or less.

2. The top plate for a cooking device according to claim 1, wherein the transparent material is an ultraviolet curable resin.

3. The top plate for a cooking device according to claim 1, wherein the light transmissive layer further serves as an adhesive layer.

4. The top plate for a cooking device according to claim 1, wherein the light blocking layer contains a resin and a coloring pigment.

5. The top plate for a cooking device according to claim 1, wherein the light transmissive layer and the light blocking layer have substantially the same thickness.

6. The top plate for a cooking device according to claim 1, wherein the dielectric multi-layer is a layered film formed so that high-refractive index films having a relatively high refractive index and low-refractive index films having a relatively low refractive index are alternately layered.

7. A top plate for a cooking device that includes a displaying region capable of showing information given from a display and a non-displaying region blocking visible light, the top plate comprising:
   a glass substrate having a cooking surface on which a utensil is to be put and an underside surface opposite to the cooking surface;
   a dielectric multi-layer provided on the underside surface of the glass substrate;
   a light transmissive layer provided on a portion of the dielectric multi-layer overlapped with the displaying region and containing a transparent material; and
   a light blocking layer provided on a portion of the dielectric multi-layer overlapped with the non-displaying region,
   wherein the top plate has a reflectance in a range of 40% to 80%,
   an absolute value of a difference in lightness between the displaying region and the non-displaying region is 5 or less, and
   an absolute value of a difference in chroma between the displaying region and the non-displaying region is 1 or less.

8. The top plate for a cooking device according to claim 1, wherein an absolute value of a difference in reflectance between the displaying region and the non-displaying region is 5% or less.

9. A display-attached top plate for a cooking device comprising:
   the top plate for a cooking device according to claim 1; and
   a display provided directly or indirectly on the light transmissive layer forming part of the top plate for a cooking device.

10. The display-attached top plate for a cooking device according to claim 9, wherein a cover glass for the display is bonded directly to the light transmissive layer.

* * * * *